United States Patent Office 3,196,575
Patented July 27, 1965

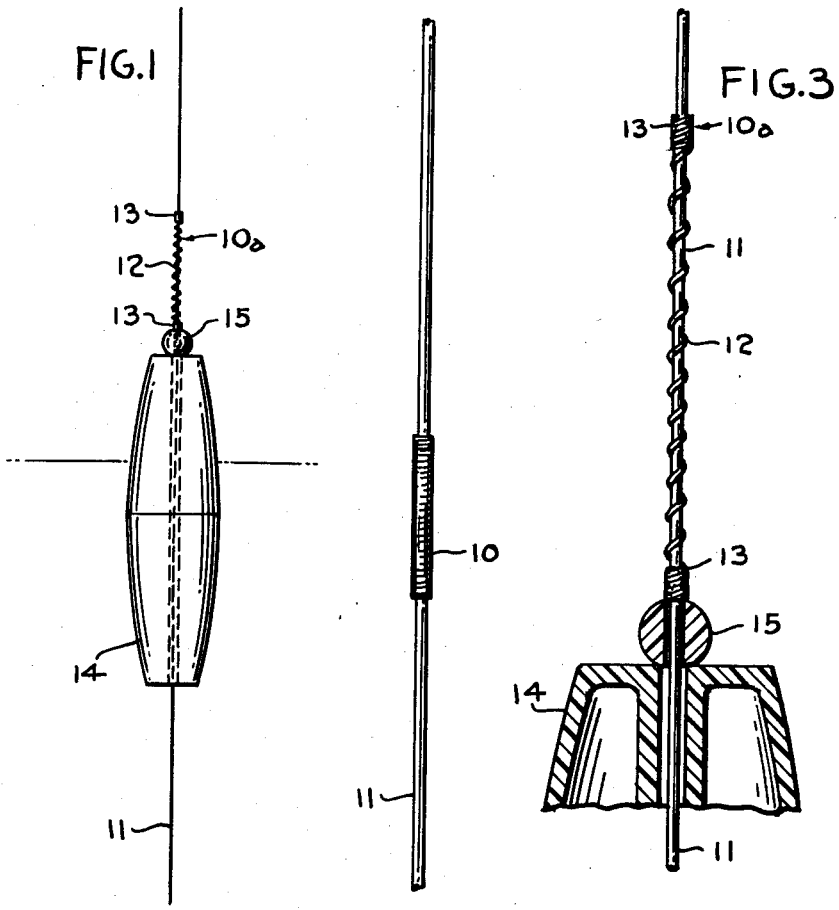

3,196,575
FISHLINE FLOAT STOP MEANS
Richard J. Kotis, 1673 Overlook Road, Kent, Ohio
Filed Nov. 26, 1963, Ser. No. 325,969
5 Claims. (Cl. 43—44.87)

This invention relates to fishing tackle and, in particular, relates to an improved stop means for a fishline float.

Heretofore, fishing floats have been provided with an apertured portion through which the fishline was relatively slidably received, except as limited by stop engagement of the apertured portion with a fixed enlargement on the line, such as a knot tied in the same. A knot tied in a line, however, had extremely limited use, and satisfactory knots could not be tied in certain synthetic resin monofilaments, silicon lubricated polyester, or nylon monofilaments. Moreover, knots or other such stop enlargements on fishlines prevented or interfered with free passage of the line through guide means therefor on a fishing reel.

One object of the present invention is to provide simple, float stop means which is easily, manually adjustable to selective positions of fixed stop adjustment on the line.

Another object of the invention is to provide float stop means of such unobtrusive character that it may be freely wound with the line onto a fishing reel.

These and other objects of the invention will be manifest from the following brief description and the accompanying drawings.

Of the accompanying drawings:

FIGURE 1 is a side view illustrating use of the improved stop means on a fishline, and a float or bobber in stop engagement therewith.

FIGURES 2 and 3 are greatly enlarged views, corresponding to FIGURE 1, but illustrating steps of applying a coil of wire onto the fishline, and of the coiled wire formed into the float stop of the invention, respectively.

Referring particularly to FIGURE 2, the numeral 10 designates a bobber stop comprising a length of coiled, fine wire (i.e., approximately 1/32 inch O.D x 5/16 inch long), such as spring tempered Phosphor bronze, having the characteristic of being manually formable to different given shapes, as opposed to having spring-like resiliency as in tension and compression springs. The coil 10, in original formed condition as described, and as shown in FIGURE 2, may have an internal diameter slightly greater than the diameter of a monofilament fishline 11 to be freely slidable along the same. By initially grasping short opposite end portions 13, 13 of the coil 10, between the thumbs and forefingers of opposite hands, and gently pulling the end portions in opposite directions accordion style, the central portion 12 is extensible to suit, as best shown in FIGURE 3, with a consequent reduction in diameter causing said central portion frictionally to grip the fishline 11. The end portions 13, 13 remain unextended and cylindrical to serve as stops as well as guide portions. As shown in FIGURES 1 and 3, the extended coil 10a becomes frictionally affixed to the fishline, to serve as a stop for a float or bobber 14 freely slidably received on the fishline.

A bead 15, having an aperture of smaller diameter than the outside diameter of the extended coil 10a may be interposed between the float 14 and one of the end portions 13 of the coil (see FIGURES 1 and 3), especially when the float has a line-receiving aperture of larger diameter than the coil.

In use of the improved float stop affixed on the fishline 11, as shown in FIGURES 1 and 3, it is best adjusted in forward direction along the line by gripping the rearward end portion 13 between thumb and forefinger of one hand, and gently pushing the coil forwardly to the new position. This action tends somewhat yieldingly to contract the intermediate portion 12 of the coil 10a and enlarge the diameter thereof. If necessary, the grip of the repositioned coil 10a may be strengthened by slight manual extension thereof, substantially as previously described.

With the formed coil 10a affixed on the line as set forth above, when the line is thrown in water with the float 14 thereon, the line will adjust itself with respect to the float 12 until the float urges the bead 15 into stop engagement with the nearest end portion 13 of the coil, as shown in full and chain-dotted lines in FIGURES 1 and 3, respectively. When fishing with a casting rod, for example, the line 11, with the stop 10a frictionally gripping the same, will pass easily through conventional spinning, casting or spin-cast reels.

Phosphor bronze is well known to be a hard, tough bronze, containing a small amount of phosphorous. It is equally well known that Phosphor bronze can be tempered to moderate the hardness and elasticity of the same.

Modification of the invention may be resorted to without departing from the spirit thereof or the scope of the appended claims.

What is claimed is:

1. An adjustable stop for a fishing float including an apertured portion for sliding reception of a fishline; comprising a tubular coil of hard, fine wire on the order of Phosphor bronze which in original coiled condition has an internal diameter greater than the diameter of the fishline; said wire having the characteristic of being tempered to be manually formable to given shapes as opposed to having the usual spring-like resiliency of compression and tension springs, said coil being axially extended intermediate the ends and the extended portion being correspondingly radially contracted, said extended coil when slidably received on the fishline being manually, varyingly adjustable between selectively fixed conditions of axial extension and contraction thereof effecting corresponding radial contraction and extension, respectively, intermediate the ends of the coil; said coil in radially contracted condition thereby frictionally gripping the line, for stopping sliding movement of the float by engagement of said apertured portion with an end of the gripped coil, the gauge of said hard, fine wire being such that the outside diameter of the coil will pass easily through the eyes of conventional line-winding reels.

2. The combination with a fishing float having an apertured portion and a fishline slidably received through the apertured portion, of a tubular, helically wound coil of hard, fine wire on the order of Phosphor bronze, which in original formed condition would have an internal diameter slightly greater than the diameter of the fish line; said wire of the coil having the characteristic of being tempered to be manually yieldingly formable to given shapes as opposed to having the usual spring-like resiliency of compression and tension springs; said coil being axially extended intermediate the ends and the extended portion being correspondingly radially contracted frictionally to grip the line and resist sliding movement of the coil on the line; movement of the float along the line being limited by engagement of said apertured portion with an end of the gripped coil; said intermediate coil portion being manually yieldingly adjustable to reposition the coil in likewise frictionally gripped positions on the line, the gauge of said hard, fine wire being such that the outside diameter of the coil will pass easily through the eyes of conventional line-winding reels.

3. The combination as in claim 2, wherein the opposite end portions of the coil are in relatively unextended, cylindrical condition.

4. The combination as in claim 3, wherein said wire is tempered Phosphor bronze.

5. The combination as in claim 2, wherein said wire is tempered Phosphor bronze.

References Cited by the Examiner

UNITED STATES PATENTS

| | | | |
|---|---|---|---|
| 1,317,496 | 9/19 | Hessler | 43—44.91 X |
| 1,865,179 | 6/32 | Egli. | |

FOREIGN PATENTS

| | | |
|---|---|---|
| 818,314 | 6/37 | France. |
| 961,866 | 11/49 | France. |

ABRAHAM G. STONE, *Primary Examiner.*